(12) United States Patent
Brown et al.

(10) Patent No.: US 6,324,446 B1
(45) Date of Patent: Nov. 27, 2001

(54) ROLL OVER STABILITY CONTROL FOR AN AUTOMOTIVE VEHICLE

(75) Inventors: Todd Allen Brown, Dearborn; Douglas Scott Rhode, Farmington Hills, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/468,235

(22) Filed: Dec. 21, 1999

(51) Int. Cl.$^7$ .................................................. G05D 1/00

(52) U.S. Cl. ............................ 701/1; 701/38; 701/41; 180/282; 340/429; 340/440

(58) Field of Search .................................. 701/1, 38, 41, 701/45; 280/755; 296/190.03; 180/271, 282, 276, 283; 340/440, 429

(56) References Cited

U.S. PATENT DOCUMENTS

| Re. 30,550 | 3/1981 | Reise . |
|---|---|---|
| 2,917,126 | 12/1959 | Phillips . |
| 3,608,925 | 9/1971 | Murphy . |
| 3,948,567 | 4/1976 | Kasselmann et al. . |
| 3,972,543 | 8/1976 | Presley et al. . |
| 4,023,864 | 5/1977 | Lang et al. . |
| 4,480,714 | 11/1984 | Yabuta et al. . |
| 4,592,565 | 6/1986 | Eagle . |
| 4,809,183 | 2/1989 | Eckert . |
| 4,898,431 | 2/1990 | Karnopp et al. . |
| 4,964,679 | 10/1990 | Rath . |

(List continued on next page.)

FOREIGN PATENT DOCUMENTS

| 36 16 907 | 11/1987 | (DE) . |
|---|---|---|
| 38 15 938 | 11/1989 | (DE) . |
| 43 21 571 | 1/1994 | (DE) . |
| 42 27 886 | 2/1994 | (DE) . |
| 42 28 893 | 3/1994 | (DE) . |
| 43 35 979 | 4/1995 | (DE) . |
| 196 02 879 | 8/1997 | (DE) . |
| 197 51 867 | 5/1999 | (DE) . |
| 197 51 891 | 5/1999 | (DE) . |
| 197 51 925 | 5/1999 | (DE) . |
| 197 51 935 | 5/1999 | (DE) . |
| 198 02 041 | 7/1999 | (DE) . |
| 199 07 633 | 10/1999 | (DE) . |
| 197 51 839 | 5/2000 | (DE) . |
| 0758601 | 2/1997 | (EP) . |
| 24 25 342 | 12/1979 | (FR) . |
| 2257403 | 1/1993 | (GB) . |
| 2316455 | 2/1998 | (GB) . |
| 63151539 | 6/1988 | (JP) . |
| 63203456 | 8/1988 | (JP) . |

(List continued on next page.)

OTHER PUBLICATIONS

A Method For Reducing On–Road Rollovers—Anit–Rollover Braking, Thomas J. Wielenga, Dynamotive, L.L.C., International Congress and Exposition, Detroit, Michigan, Mar. 1–4, 1999.

*Primary Examiner*—Yonel Beaulieu
(74) *Attorney, Agent, or Firm*—Gregory P. Brown (57) ABSTRACT

A stability control system 24 for an automotive vehicle as includes a plurality of sensors 28–37 sensing the dynamic conditions of the vehicle and a controller 26 that controls a distributed brake pressure to reduce a tire moment so the net moment of the vehicle is counter to the roll direction. The sensors include a speed sensor 30, a lateral acceleration sensor 32, a roll rate sensor 34, and a yaw rate sensor 20. The controller 26 is coupled to the speed sensor 30, the lateral acceleration sensor 32, the roll rate sensor 34, the yaw rate sensor 28. The controller 26 determines a roll angle estimate in response to lateral acceleration, roll rate, vehicle speed, and yaw rate. The controller 26 changes a tire force vector using a steering angle change in response to the relative roll angle estimate.

16 Claims, 5 Drawing Sheets

U.S. PATENT DOCUMENTS

| | | |
|---|---|---|
| 4,976,330 | 12/1990 | Matsumoto . |
| 4,998,593 | 3/1991 | Karnopp et al. . |
| 5,089,967 | 2/1992 | Haseda et al. . |
| 5,224,765 | 7/1993 | Matsuda . |
| 5,335,176 | 8/1994 | Nakamura . |
| 5,408,411 | 4/1995 | Nakamura et al. . |
| 5,446,658 | 8/1995 | Pastor et al. . |
| 5,610,575 | 3/1997 | Gioutsos . |
| 5,634,698 | 6/1997 | Cao et al. . |
| 5,640,324 | 6/1997 | Inagaki . |
| 5,671,982 | 9/1997 | Wanke . |
| 5,707,117 | 1/1998 | Hu et al. . |
| 5,707,120 | 1/1998 | Monzaki et al. . |
| 5,732,378 | 3/1998 | Eckert et al. . |
| 5,732,379 | 3/1998 | Eckert et al. . |
| 5,737,224 | 4/1998 | Jeenicke et al. . |
| 5,742,918 | 4/1998 | Ashrafi et al. . |
| 5,762,406 | 6/1998 | Yasui et al. . |
| 5,782,543 | 7/1998 | Monzaki et al. . |
| 5,809,434 | 9/1998 | Ashrafi et al. . |
| 5,825,284 | 10/1998 | Dunwoody et al. . |
| 5,857,535 | 1/1999 | Brooks . |
| 5,869,943 | 2/1999 | Nakashima et al. . |
| 5,890,084 | 3/1999 | Halasz et al. . |
| 5,893,896 | 4/1999 | Imamura et al. . |
| 5,931,546 | 8/1999 | Nakashima et al. . |
| 6,002,974 | 12/1999 | Schiffman . |
| 6,002,975 | 12/1999 | Schiffman et al. . |
| 6,038,495 | 3/2000 | Schiffman . |
| 6,065,558 | 5/2000 | Wielenga . |

FOREIGN PATENT DOCUMENTS

| | | |
|---|---|---|
| 1101238 | 4/1989 | (JP) . |
| 2171373 | 7/1990 | (JP) . |
| 3042360 | 2/1991 | (JP) . |
| 3045452 | 2/1991 | (JP) . |
| 4008837 | 1/1992 | (JP) . |
| 5016699 | 1/1993 | (JP) . |
| 5254406 | 10/1993 | (JP) . |
| 6278586 | 10/1994 | (JP) . |
| 6312612 | 11/1994 | (JP) . |
| 8080825 | 3/1996 | (JP) . |
| 9005352 | 1/1997 | (JP) . |
| 10024819 | 1/1998 | (JP) . |
| 63116918 | 5/1998 | (JP) . |
| 10278762 | 10/1998 | (JP) . |
| 10329682 | 12/1998 | (JP) . |
| 11011272 | 1/1999 | (JP) . |
| 11170992 | 6/1999 | (JP) . |
| 11254992 | 9/1999 | (JP) . |
| 11255093 | 9/1999 | (JP) . |
| 11304663 | 10/1999 | (JP) . |
| 11304662 | 11/1999 | (JP) . |
| 816849 | 3/1981 | (SU) . |
| WO 99/30942 | 6/1999 | (WO) . |

ROLL OVER STABILITY CONTROL FOR AN AUTOMOTIVE VEHICLE

TECHNICAL FIELD

The present invention relates generally to a dynamic behavior control apparatus for an automotive vehicle, and more specifically, to a method and apparatus for controlling the roll characteristics of the vehicle by changing steering angle.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the roll over characteristic of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the vehicle body on a plane or nearly on a plane parallel to the road surface. Roll over control is maintaining the vehicle wheels on the road surface. One system of tilt control system is described in U.S. Pat. No. 5,869,943. The '943 patent uses the combination of yaw control and tilt control to maintain the vehicle body horizontal while turning. The system is used in conjunction with the front outside wheels only. To control tilt, a brake force is applied to the front outside wheels of a turn. One problem with the application of a brake force to only the front wheels is that the cornering ability of the vehicle may be reduced. Another disadvantage of the system is that the yaw control system is used to trigger the tilt control system. During certain vehicle maneuvers, the vehicle may not be in a turning or yawing condition but may be in a rollover condition. Such a system does not address preventing rollover in a vehicle.

It would therefore be desirable to provide a roll stability system that detects a potential rollover condition and as well as to provide a system not dependent upon a yaw condition.

SUMMARY OF THE INVENTION

It is therefore an object of the invention to provide a roll control system for use in a vehicle that is not dependent upon the turning condition of the vehicle.

In one aspect of the invention, stability control system for an automotive vehicle includes a plurality of sensors sensing the dynamic conditions of the vehicle and a controller that controls a distributed brake pressure to reduce a tire moment so the net moment of the vehicle is counter to the roll direction. The sensors include a speed sensor, a lateral acceleration sensor, a roll rate sensor, and a yaw rate sensor. A controller is coupled to the speed sensor, the lateral acceleration sensor, the roll rate sensor, the yaw rate sensor. The controller determines a roll angle estimate in response to lateral acceleration, roll rate, vehicle speed, and yaw rate. The controller determines a steering angle change in response to the relative roll angle estimate. The controller may also use longitudinal acceleration and pitch rate to determine the roll angle estimate.

In a further aspect of the invention, a method of controlling roll stability of the vehicle comprises the steps of:
determining a roll angle estimate in response to lateral acceleration, roll rate, vehicle speed, and yaw rate; and
effecting a tire force vector in response to the relative roll angle estimate by changing a steering angle.

One advantage of the invention is that the turning radius of the vehicle is not affected by the roll stability control.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
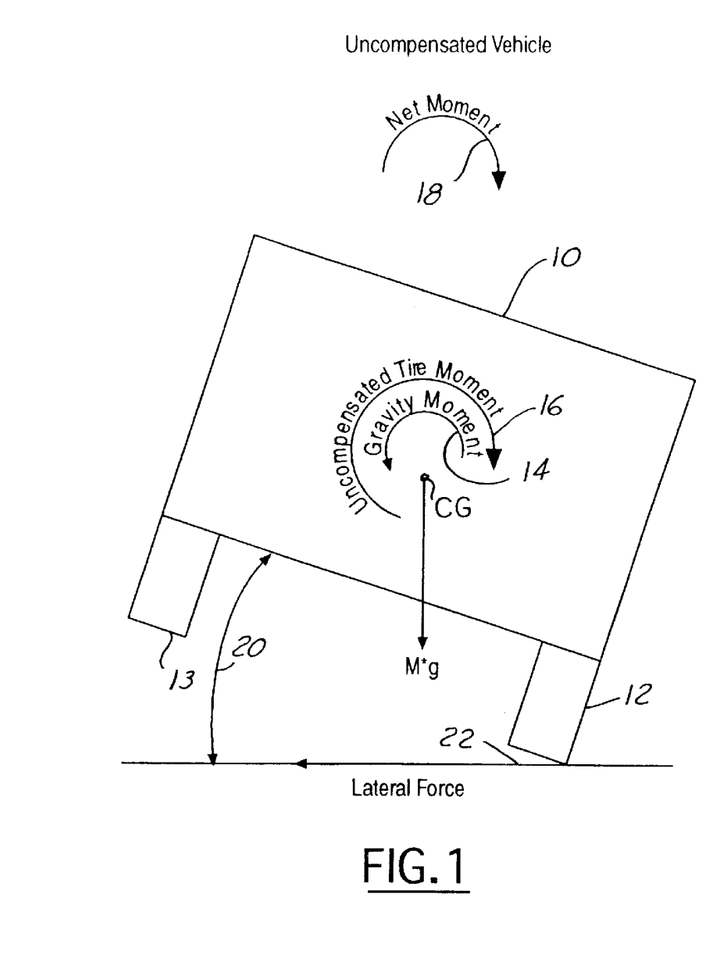
FIG. 1 is a diagrammatic rear view of a vehicle with force vectors not having a roll stability system according to the present invention.

Referring to FIG. 1, an automotive vehicle 10 without a rollover stability system of the present invention is illustrated with the various forces and moments thereon during a rollover condition. Vehicle 10 has right and left tires 12 and 13 respectively. Generally, the vehicle has a weight represented as M*g at the center of gravity of the vehicle. A gravity moment 14 acts about the center of gravity (CG) in a counter-clockwise direction. A tire moment 16 acts in a clockwise direction about the center of gravity. Thus, the net moment 18 acting upon the vehicle is in a clockwise direction and thus increases the roll angle 20 of the vehicle. The lateral force 22 at the tire 12 on the ground (tire vector) is a significant force to the left of the diagram capable of overturning the vehicle is uncorrected.

Figure 2:
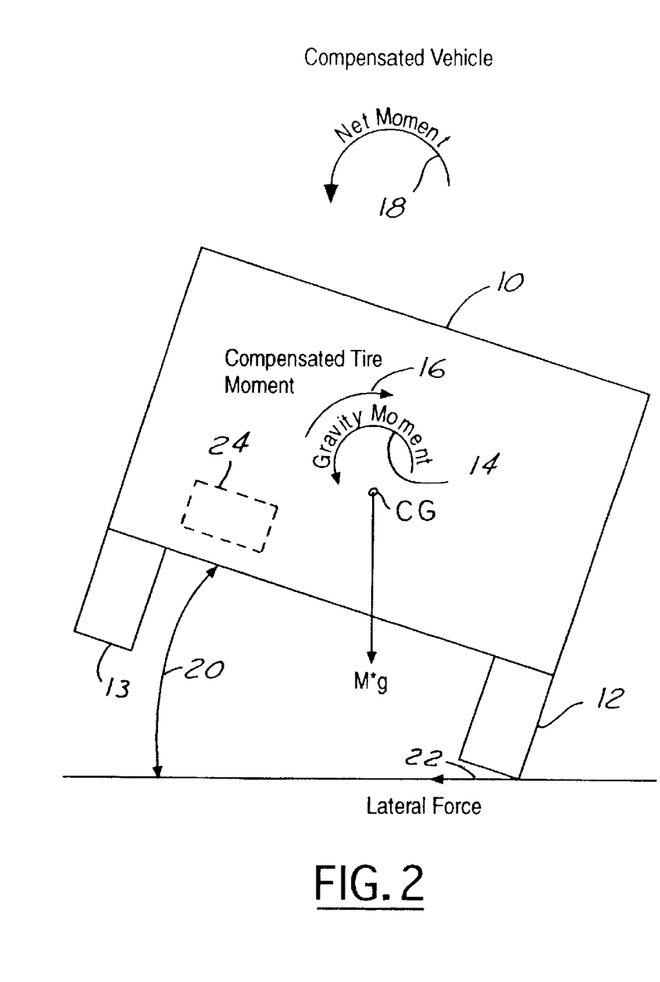
FIG. 2 is a diagrammatic rear view of a vehicle with force vectors having a roll stability system according to the present invention.

Referring now to FIG. 2, a roll stability control system 24 is included within vehicle 10, which is in a roll condition. The forces illustrated in FIG. 2 are given the same reference numerals as the forces and moments in FIG. 1. In FIG. 2, however, roll stability controller 24 reduces the tire moment 16 to provide a net moment 18 in a counter-clockwise direction. Thus, the tire vector or lateral force 22 at tire 12 is reduced as well. This tendency allows the vehicle to tend toward the horizontal and thus reduce angle 20.

Figures 3, 5, 6:
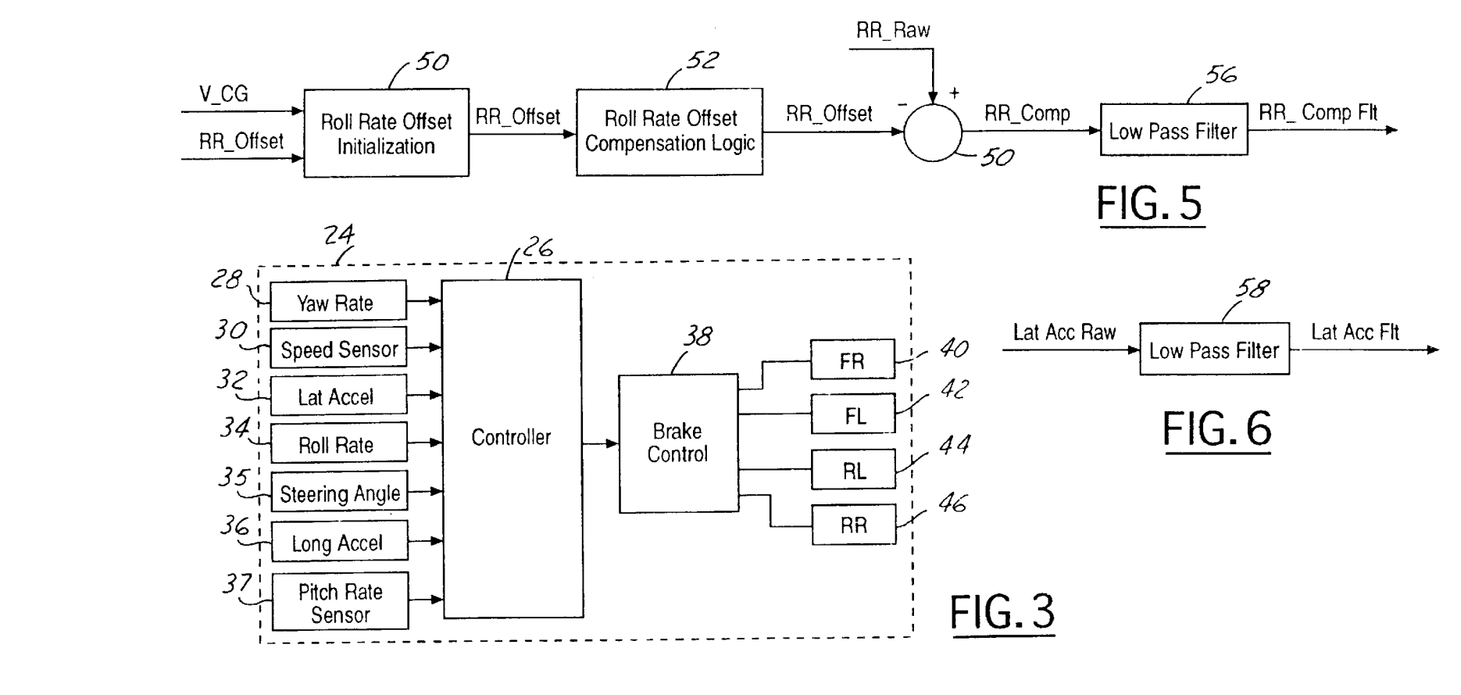
FIG. 3 is a block diagram of a roll stability system according to the present invention.
FIG. 5 is a flow chart of roll rate determination according to the present invention.
FIG. 6 is a flow chart of a lateral acceleration determination according to the present invention.

Referring now to FIG. 3, roll stability control system 24 has a controller 26 used for receiving information from a yaw rate sensor 28, a speed sensor 30, a lateral acceleration sensor 32, a roll rate sensor 34, a steering angle sensor 35, a longitudinal acceleration sensor 36 and a pitch rate sensor 37. Lateral acceleration and speed may be obtained using a global positioning system (GPS). Based upon inputs from the sensors, controller 26 controls a tire force vector by brake control 38 as will be further described below or changing the steering angle. Depending on the desired sensitivity of the system and various other factors, not all the sensors 28–37 may be used in a commercial embodiment.

Brake control 38 controls the front right brake 40, the front left brake 42, the rear left brake 44, and the right rear brake 46. Based on the inputs from sensors 28 through 34, controller 26 determines a roll condition and controls the brake pressure of the brakes on the appropriate side of the vehicle. The braking pressure is balanced on the side of the vehicle to be controlled between the front and rear brakes to minimize the induced yaw torque and induced path deviation. The yaw rate sensor 28 generates a raw yaw rate signal (YR_Raw).

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity (V_CG). Various other algorithms are known to those skilled in the art. For example, if speed is determined while speeding up or braking around a corner, the lowest or highest wheel speed may be not used because of its error.

Figure 4:
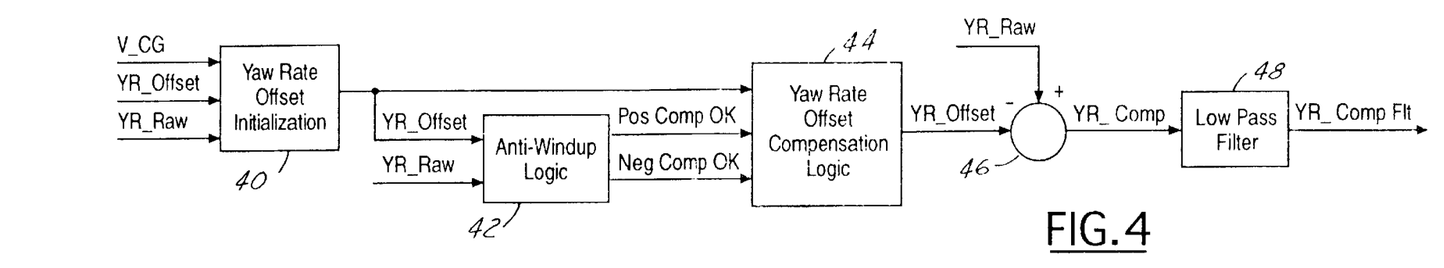
FIG. 4 is a flow chart of a yaw rate determination according to the present invention.

Referring now to FIG. 4, a yaw rate compensated and filtered signal (YR_CompFlt) is determined. The velocity of the vehicle at center of gravity (V_CG), the yaw rate offset (YR_Offset) and the raw yaw rate signal from the yaw rate sensor (YR_Raw) are used in a yaw rate offset initialization block 40 to determine an initial yaw rate offset. Because this is an iterative process, the yaw rate offset from the previous calculation is used by yaw rate offset initialization block 40. If the vehicle is not moving as during startup, the yaw rate offset signal is that value which results in a compensated yaw rate of zero. This yaw rate offset signal helps provide an accurate reading. For example, if the vehicle is at rest, the yaw rate signal should be zero. However, if the vehicle is reading a yaw rate value then that yaw rate value is used as the yaw rate offset. The yaw rate offset signal along with the raw yaw rate signal is used in the anti-windup logic block 42. The anti-windup logic block 42 is used to cancel drift in the yaw rate signal. The yaw rate signal may have drift over time due to temperature or other environmental factors. The anti-windup logic block also helps compensate for when the vehicle is traveling constantly in a turn for a relatively long period. The anti-windup logic block 42 generates either a positive compensation OK signal (Pos Comp OK) or a negative compensation OK signal (Neg Comp OK). Positive and negative in this manner have been arbitrarily chosen to be the right and left direction with respect to the forward direction of the vehicle, respectively. The positive compensation OK signal, the negative compensation OK signal and the yaw rate offset signal are inputs to yaw rate offset compensation logic block 44.

The yaw rate offset compensation logic block 44 is used to take data over a long period of time. The data over time should have an average yaw of zero. This calculation may be done over a number of minutes. A yaw rate offset signal is generated by yaw rate offset compensation logic 44. A summing block 46 sums the raw yaw rate signal and the yaw rate offset signal to obtain a yaw rate compensated signal (YR_Comp).

A low pass filter 48 is used to filter the yaw rate compensated signal for noise. A suitable cutoff frequency for low pass filter 48 is 20 Hz.

Referring now to FIG. 5, a roll rate compensated and filtered signal (RR_CompFlt). The roll rate compensated and filtered signal is generated in a similar manner to that described above with respect to yaw rate. A roll rate offset initialization block 50 receives the velocity at center of gravity signal and a roll rate offset signal. The roll rate offset signal is generated from a previous iteration. Like the yaw rate, when the vehicle is at rest such as during startup, the roll rate offset signal is zero.

A roll rate offset compensation logic block 52 receives the initialized roll rate offset signal. The roll rate offset compensation logic generates a roll rate offset signal which is combined with the roll rate raw signal obtained from the roll rate sensor in a summing block 54. A roll rate compensated signal (RR_Comp) is generated. The roll rate compensated signal is filtered in low pass filter 56 to obtain the roll rate compensated and filtered signal that will be used in later calculations.

Referring now to FIG. 6, the raw lateral acceleration signal (Lat Acc Raw) is obtained from lateral acceleration sensor 32. The raw lateral acceleration signal is filtered by a low pass filter to obtain the filtered lateral acceleration signal (Lat Acc Flt). The filter, for example, may be a 20 Hz low pass filter.

Figure 7:
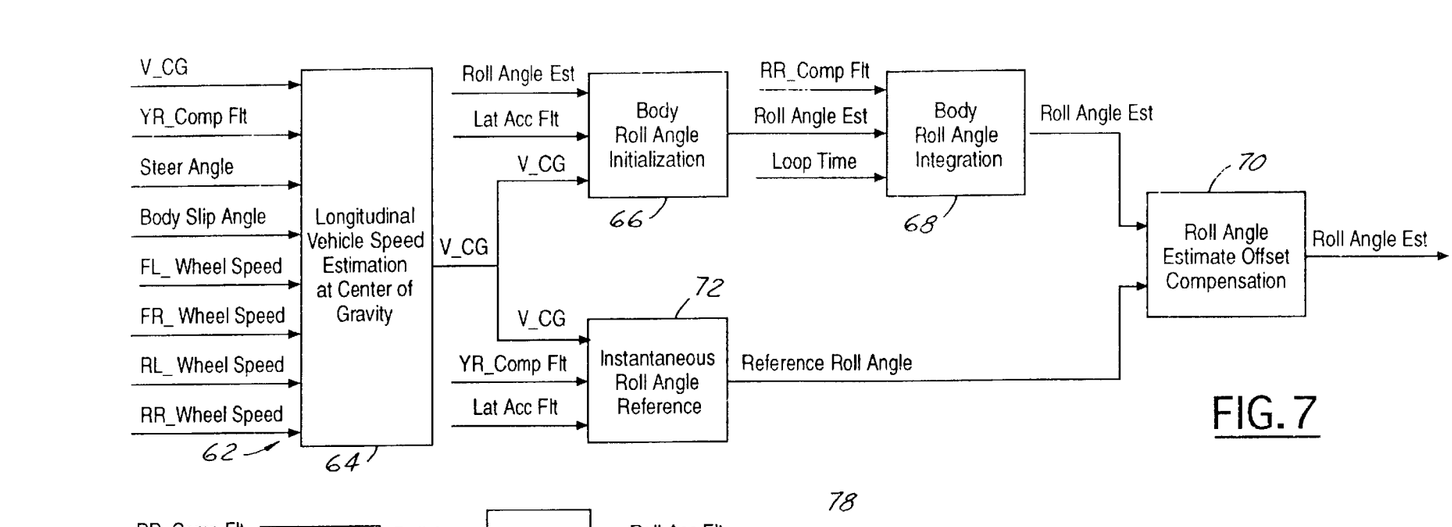
FIG. 7 is a flow chart of chassis roll angle estimation and compensation.

Referring now to FIG. 7, a roll angle estimation signal (RollAngleEst) is determined by chassis roll estimation and compensation procedure 62. Block 64 is used to obtain a longitudinal vehicle speed estimation at the center of gravity of the vehicle. Various signals are used to determine the longitudinal vehicle speed at the center of gravity including the velocity of the vehicle at center of gravity determined in a previous loop, the compensated and filtered yaw rate signal determined in FIG. 4, the steering angle, the body slip angle, the front left wheel speed, the front right wheel speed, the rear left wheel speed, and the rear right wheel speed.

The new velocity of the center of gravity of the vehicle is an input to body roll angle initialization block 66. Other inputs to body roll angle initialization block 66 include roll angle estimate from the previous loop and a filtered lateral acceleration signal derived in FIG. 6. An updated roll angle estimate is obtained from body roll angle initialization. The updated roll angle estimate, the compensation and filtered roll rate determination from FIG. 5, and the time of the loop is used in body roll angle integration block 68. The updated roll angle estimate is equal to the loop time multiplied by the compensated and filtered roll rate which is added to the previous roll angle estimate obtained in block 66. The updated roll angle estimate is an input to roll angle estimate offset compensation block 70.

The velocity at the center of gravity of the vehicle is also an input to instantaneous roll angle reference block 72. Other inputs to instantaneous roll angle reference block 72 include the compensated and filtered yaw rate from FIG. 4 and the filtered lateral acceleration signal from FIG. 6. The following formula is used to determine a reference roll angle:

Reference Roll Angle=ARCSin[1/g(VCG*YRCompFlt-LatAccFlt)]

Where g is the gravitational constant 9.81 m/s².

The reference roll angle from block 72 is also an input to roll angle estimate offset compensation. The updated roll angle estimation is given by the formula:

Roll AngleEst = Roll AngleEst (fromBlock 68) +

(ReferenceRollAngle − RollAngleEst (Block 68)) $\frac{\text{loop time}}{\text{Tau}}$ Where Tau is a time constant and may be a function of steering velocity, LatAcc and V-CG. A suitable time constant may, for example, be 30 seconds.

Figure 8:
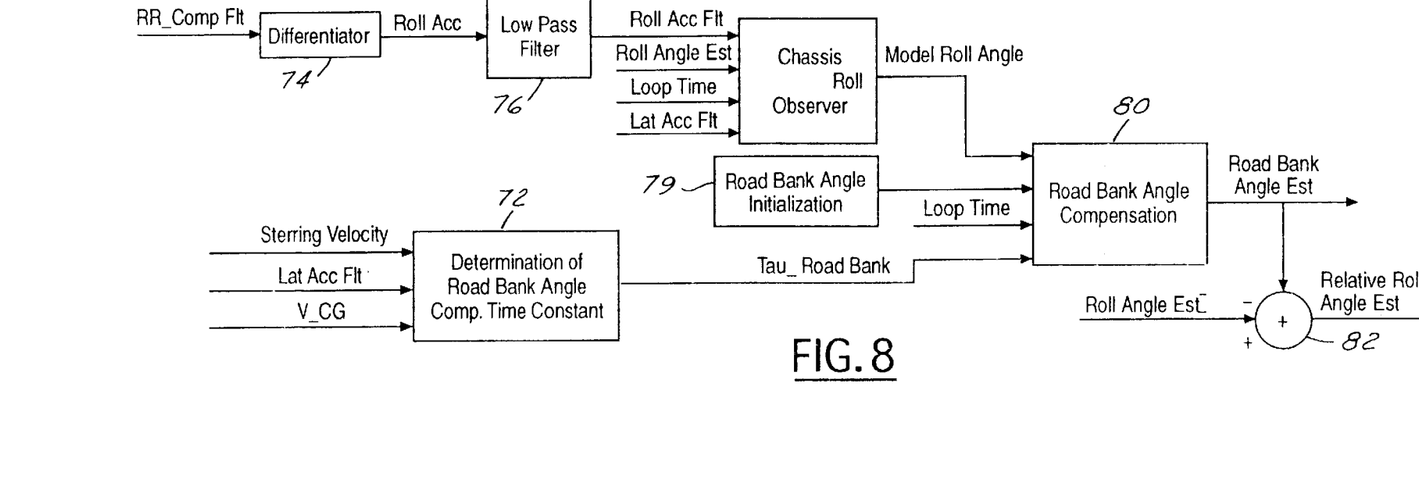
FIG. 8 is a flow chart of a relative roll calculation.

Referring now to FIG. 8, a relative roll angle estimation (RelativeRollAngleEst) and a road bank angle estimate signal is determined. The first step of the relative roll angle calculation involves the determination of road bank angle compensation time constant (Tau) block 72. The velocity at the center of gravity, the steering velocity and the filtered lateral acceleration signal from FIG. 6 are used as inputs. A compensated and filtered roll rate (RR_CompFlt) is used as an input to a differentiator 74 to determine the roll acceleration (Roll Acc). Differentiator 74 takes the difference between the compensated and filtered roll rate signal from the previous loop and the compensated and filtered roll rate from the current loop divided by the loop time to attain the roll acceleration. The roll acceleration signal is coupled to a low pass filter 76. The filtered roll acceleration signal (Roll Acc Flt), roll angle estimate, the filtered lateral acceleration signal and the loop time are coupled to chassis relative roll observer block 78. The chassis roll observer 78 determines the model roll angle estimation (Model Roll Angle Est). The model roll angle is a stable estimation of the roll dynamics of the vehicle which allows the estimates to converge to a stable condition over time.

From the model roll angle estimation from block 78, the initial relative roll angle estimation from block 72, a road bank angle initialization from a block 79 loop time and a roll angle estimate, road bank angle compensation block 80 determines a new road bank angle estimate. The formula for road bank angle is:

Road Bank AngleEst =

$\frac{\text{LoopTime}}{\text{Tau Road\_Bank}} * \left( \text{Roll AngleEst} - \left( \begin{array}{c} \text{Mode Roll Angle} + \\ \text{Road BankAngleEst} \end{array} \right) \right)$ The roll angle estimate may be summed with the road bank angle estimate from block 80 in summer 82 to obtain a relative roll angle estimate. The road bank angle estimate may be used by other dynamic control systems.

Figure 9:
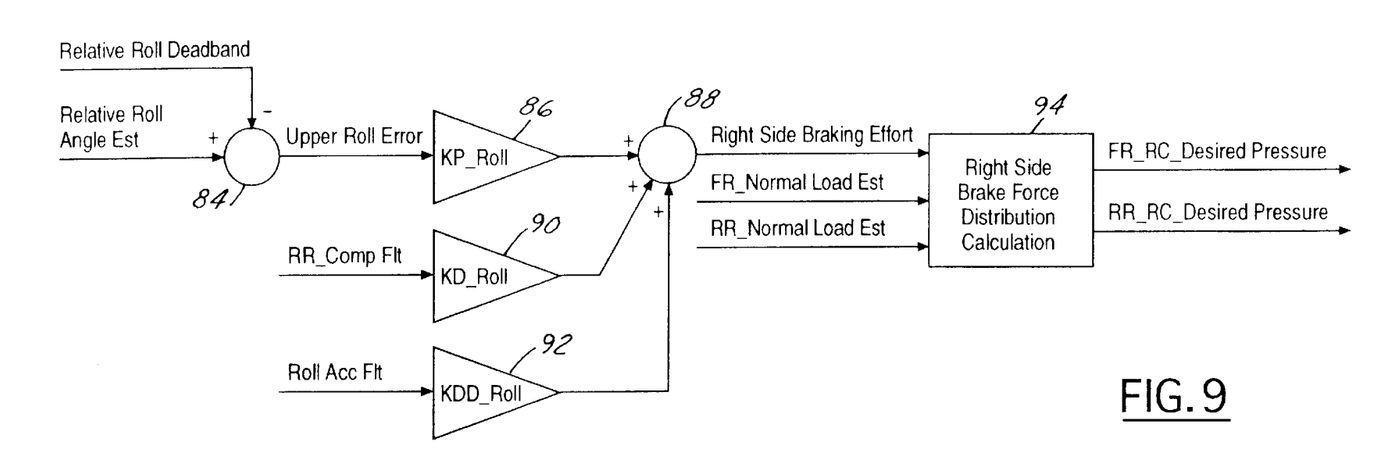
FIG. 9 is a flow chart of system feedback for the right side of the vehicle resulting in brake distribution force.

Referring now to FIG. 9, the relative roll angle estimate from FIG. 8 and a relative roll deadband are summed in summer 84 to obtain an upper roll error. The upper roll error is amplified in KP_Roll Amplifier 86 and is coupled to summer 88. The roll rate compensated and filtered signal from FIG. 5 is coupled to KD_Roll Amplifier 90. The amplified roll rate signal is coupled to summer 88. The filtered roll acceleration signal from block 8 is coupled to KDD_Roll Amplifier 82. The amplified signal is also coupled to summer 88. The proportioned sum of the amplified signals is the right side braking force effort. From this, the right side brake force distribution calculation block 94 is used to determine the distribution of brake pressure between the front and rear wheels. The front right normal load estimate and the rear right normal load estimate are inputs to block 94. The front right roll control desired pressure and the right rear roll control desire pressure are outputs of block 94. The block 94 proportions the pressure between the front right and rear right signals to prevent roll. The front right, for example, is proportional according to the following formula:

$$FR \text{ desired pressure} = \text{Right side braking effort} \left( \frac{FR \text{Normal}}{FR + RR} \right)$$

The output of block 94 is used by the brake controller of FIG. 3 to apply brake pressure to the front right and rear right wheels. The brake controller factors in inputs such as the brake pressure currently applied to the vehicle through the application of pressure by the driver on the brake pedal. Other inputs include inputs from other dynamic control systems such as a yaw control system.

Figure 10:
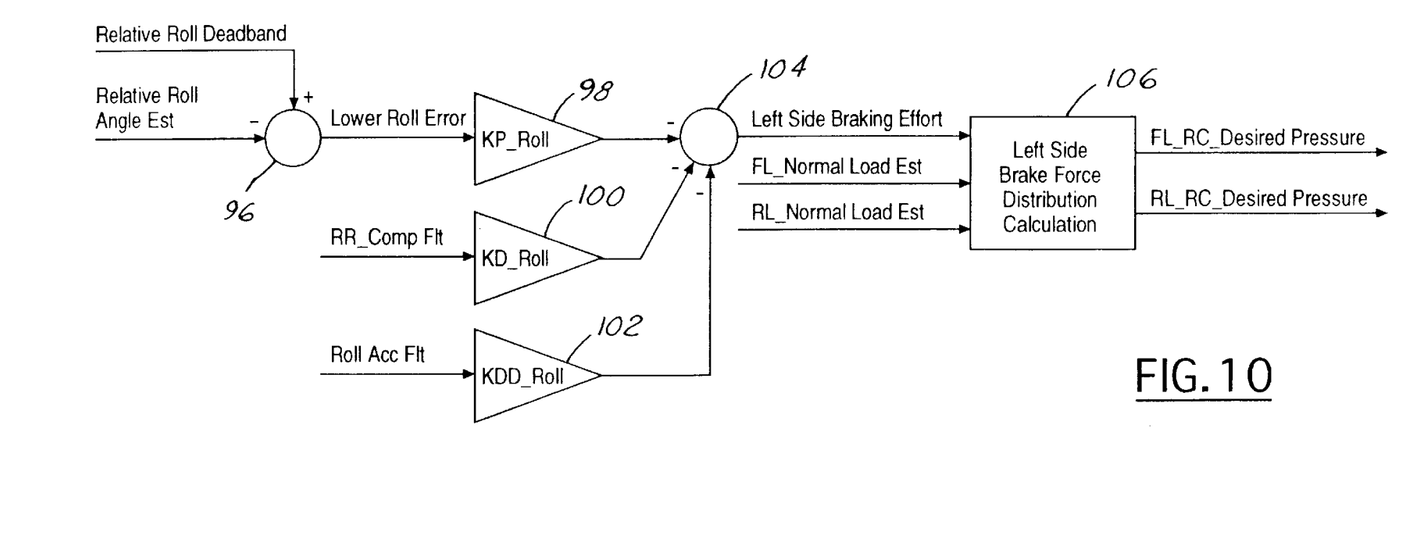
FIG. 10 is a flow chart of system feedback for the left side of the vehicle.

Referring now to FIG. 10, a similar calculation to that of FIG. 9 is performed for the left side of the vehicle. The relative roll angle estimate and relative roll deadband are inputs to summing block 96. However, the signs are changed to reflect that the left side of the vehicle is a negative side of the vehicle. Therefore, relative roll angle estimate and relative roll deadband are purely summed together 96 in summing block 96 to obtain the lower roll error. The lower roll error is passed through KP_Roll amplifier 98. The compensated and filtered roll rate is passed through KD_Roll amplifier 100 and the filtered roll acceleration signal is passed through KDD_Roll amplifier 102. The inverse of the signals from amplifiers 98, 100 and 102 are input and summed in summer 104 to obtain the left side braking effort.

A left side brake force distribution calculation block 106 receives the left side braking effort from summer 104. The front left normal load estimate and the rear left normal load estimate. In a similar manner to that above, the front left and rear left roll control brake pressures are determined. By properly applying the brakes to the vehicle, the tire moment is reduced and the net moment of the vehicle is counter to a roll direction to reduce the roll angle and maintain the vehicle in a horizontal plane.

Figure 11:
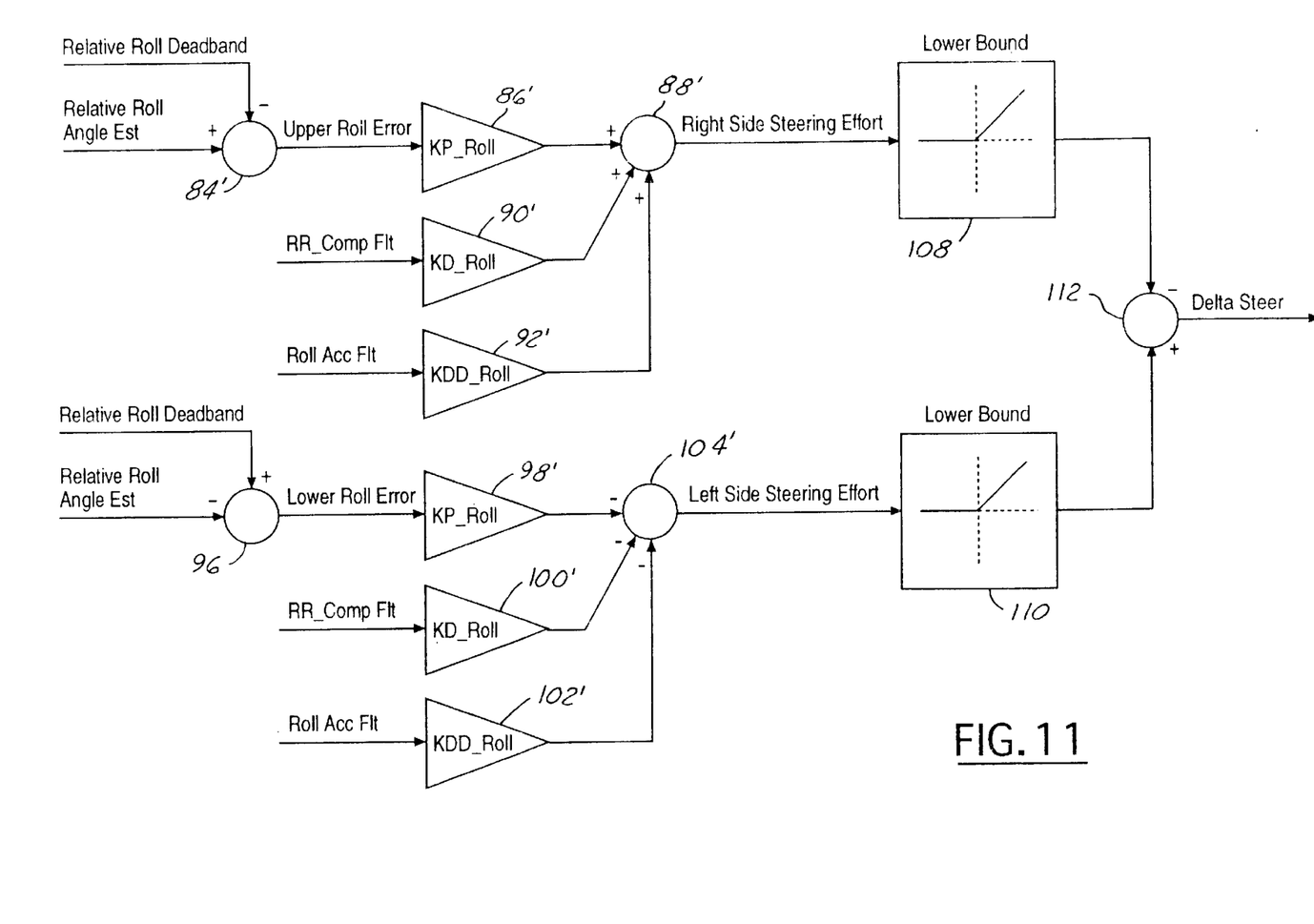
FIG. 11 is a flow chart of another embodiment similar to that of FIGS. 9 and 10 resulting in change in steering position.

Referring now to FIG. 11, a change in steering angle may be effectuated rather than or in combination with a change in brake force distribution. In either case, however, the tire force vector is changed. In FIG. 11, the same reference numerals as those in FIGS. 9 and 10 are used but are primed. Everything prior to blocks 88' and 104' is identical. Blocks 88' and 104' determine right side steering effort and left side steering effort, respectively.

The right side steering effort is placed through a clamping circuit 108 to ensure that a positive value is obtained. The left side steering effort is likewise placed through a clamping circuit 110 to ensure a positive value is obtained.

A summing block 112 receives the output from circuits 198 and 110 where the right side is negative and the left side is positive. A delta steering angle is obtained from block 112. The method of FIG. 11 is particularly suited for drive-by-wire systems or other systems that allow the steering angle to be directly controlled. The delta steering angle is an amount that changes the tire force vector to counteract roll. The delta steering angle can be used to directly move the wheels of the vehicle to physically change the direction of steering.

If both steering and brake distribution are used controller 26 will be used to apportion the amount of correction provided by steering and brake distribution. The amount of apportionment will depend on the roll rate and other variables for the particular vehicle. The amount of apportionment will thus be determined for each vehicle. For example, higher profile vehicles will be apportioned differently from a low profile vehicle.

As described above the longitudinal acceleration sensor and a pitch rate sensor may be incorporated into the above tire force vector determination. These sensors may be used as a verification as well as an integral part of the calculations. For example, the pitch rate or the longitudinal acceleration or both can be used to construct a vehicle pitch angle estimate. This estimate along with its derivative can be used to improve the calculation of the vehicle roll angle. An example of how the rate of change of the vehicle roll angle using theses variables may be constructed is:

$$GlobalRR \approx RRComp\_Flt + PitchRateCompFlt\,(-YawRate + Sin(GlobalRollAngleEst)*Tan(VehiclePitchAngleEst)) + (YawRateCompFlt*Cos(GlobalRR)*Tan(PitchAngleEst))$$

Where PitchRateCompFlt is a compensated and filtered pitch rate signal, GlobalRollAngleEst is an estimated global roll angle, VehiclePitchAngleEst is an estimated vehicle pitch angle estimate, and GlobalRR is a global roll rate signal. Of course, those skilled in the art may vary the above based upon various other factors depending on the particular system needs.

While particular embodiments of the invention have been shown and described, numerous variations and alternate embodiments will occur to those skilled in the art. Accordingly, it is intended that the invention be limited only in terms of the appended claims.

What is claimed is:

1. A stability control system for an automotive vehicle comprising:
   a speed sensor;
   a lateral acceleration sensor;
   a roll rate sensor;
   a yaw rate sensor; and
   a controller coupled to said speed sensor, said lateral acceleration sensor, said roll rate sensor, said yaw rate sensor, said controller determining a roll angle estimate in response to lateral acceleration, roll rate, vehicle speed, and yaw rate, and changing a tire force vector in response to the relative roll angle estimate by determining a steering angle change factor.

2. A stability control system as recited in claim 1 further comprising a sensor selected from the group of a steering angle sensor, a longitudinal acceleration sensor and a pitch rate sensor.

3. A stability control system as recited in claim 2 wherein said controller determines vehicle speed at a center of gravity of the vehicle in response to said steering angle and said steering sensor.

4. A stability control system as recited in claim 1 wherein said controller changes a tire force vector by determining a brake pressure distribution and said steering angle change factor.

5. A method of controlling roll stability of a vehicle having a steering angle comprising:
   determining a yaw rate for the vehicle;
   determining a roll rate for the vehicle;
   determining a lateral acceleration for the vehicle;
   determining vehicle speed; and
   generating a tire moment by determining a steering angle change in response to yaw rate, roll rate, lateral acceleration and vehicle speed so that a net moment on the vehicle is counter to a roll direction; and
   changing the steering angle by the steering angle change.

6. A method as recited in claim 5 wherein said step of generating comprises generating a tire moment in response to roll angle.

7. A method as recited in claim 5 wherein said step of generating comprises generating a tire moment in response to roll acceleration.

8. A method as recited in claim 5 wherein the step of generating a tire moment comprises the step of determining a brake force distribution in combination with the steering angle change in response to an estimate of normal loads at each corner of the vehicle.

9. A method as recited in claim 8 wherein the step of determining brake force distribution comprises controlling front brake pressure and rear brake pressure.

10. A method of controlling roll stability of a vehicle comprising the steps of:
    determining a roll angle estimate in response to lateral acceleration, roll rate, vehicle speed, and yaw rate; and
    effecting a tire force vector in response to the relative roll angle estimate by changing a steering angle.

11. A method of controlling roll stability of a vehicle as recited in claim 10 further comprising the step of determining roll rate in response to a raw roll rate signal and a roll rate offset.

12. A method of controlling roll stability of a vehicle as recited in claim 10 further comprising the step of determining roll rate in response to a yaw rate signal and a yaw rate offset.

13. A method of controlling roll stability of a vehicle as recited in claim 10 further comprising the step of determining vehicle speed at the center of gravity of the vehicle as a function of a front right wheel speed, a rear right wheel speed, a front left wheel speed, a rear left wheel speed, and a steering wheel angle.

14. A method of controlling roll stability of a vehicle as recited in claim 10 further comprising the step of determining vehicle speed at the center of gravity of the vehicle as a function of body slip angle.

15. A method of controlling roll stability of a vehicle as recited in claim 10 wherein the step of determining a tire force vector includes determining brake pressure distribution by determining right side braking effort and determining a right side brake force distribution by determining the amount of front right brake force and rear right brake force.

16. A method of controlling roll stability of a vehicle as recited in claim 15 wherein the step of determining a brake pressure distribution comprises the step of determining left side braking effort and determining a left side brake force distribution by determining the amount of front left brake force and rear right brake force.

* * * * *